E. W. SMITH.
SECONDARY OR STORAGE BATTERY.
APPLICATION FILED SEPT. 4, 1915. RENEWED JULY 15, 1921.

1,392,232.

Patented Sept. 27, 1921.

WITNESS:
Rot R Ketchel.

INVENTOR
Edward Wanton Smith
BY
Augustus B. Stoughton
ATTORNEY.

UNITED STATES PATENT OFFICE.

EDWARD WANTON SMITH, OF PHILADELPHIA, PENNSYLVANIA.

SECONDARY OR STORAGE BATTERY.

1,392,232.  Specification of Letters Patent.  Patented Sept. 27, 1921.

Application filed September 4, 1915, Serial No. 49,005. Renewed July 15, 1921. Serial No. 485,036.

*To all whom it may concern:*

Be it known that I, EDWARD WANTON SMITH, a citizen of the United States, and a resident of Philadelphia, in the county of Philadelphia and State of Pennsylvania, have invented certain new and useful Improvements in Secondary or Storage Batteries, of which the following is a specification.

Objects of the present invention are to provide a storage battery particularly of the lead sulfuric acid type which shall have a relatively long life and yet be of cheap construction; and to provide a wood separator which may act also as a retainer and which permits free passage of the electric current and free diffusion of the acid electrolyte, yet precludes the passage of any particles of lead peroxid or other sediment, no matter how fine, which may originate either at the positive or negative pole plates; which is relatively indestructible under the conditions obtaining in a lead battery, which is of relatively low electrical resistance slightly higher than that of ordinary wood and which is cheap to manufacture, The invention will be claimed at the end hereof, but will be first described in connection with the embodiments of it chosen for illustration in the accompanying drawings, in which—

Thin sheets of wood for separators in lead storage batteries have long been recognized as very advantageous.

Heretofore in the use of wood the pores occasionally allow the fine sediment which is commonly present in small quantities in the electrolyte to deposit within them and form short circuits through the wood even though no physical defect is present in the wood. Furthermore where wood comes in contact with the lead peroxid or active material of the positive pole plates, oxidation takes place, destroying the wood and thus leaving free openings where short circuits can readily occur. Again it is well known that the life of storage batteries having plates of the pasted or Faure type is usually limited by the gradual washing out of the lead peroxid from the positive pole plate due, among other things, to agitation of the electralyte which gradually softens and loosens the paste on the surface of the positive pole plate so that in time it becomes entirely detached, frequently falling to the bottom of the cell and leaving the positive plate unfit for further service. By the present invention these defects and disadvantages are minimized or entirely obviated.

Figure 4:
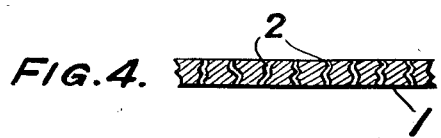
Figs. 4 and 5 are sketchy diagrammatic views to which reference will be made for the sake of explanation.
Figure 5:
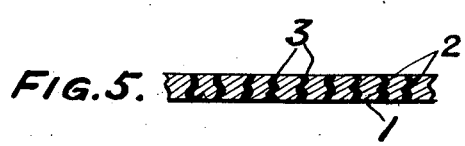

A non-porous and conducting separator embodying features of the invention consists of the combination of wood and a gelatinous substance filling the pores of interstices of the wood and such a separator or a combination of such separators possess the advantage that they can be placed face to face in contact with the positive pole plate without undue oxidation or injury due to battery or electrolytic action. For the sake of further explanation reference may be made to Figs. 4 and 5, in which 1 is a porous body having the shape of any desired type of separator. An attempt is made to show the pores 2. This is illustrative of wood and in Fig. 5 the pores of interstices 2 are shown as filled with a gelatinous conductive substance so that Fig. 4 illustrates the old art and Fig. 5 illustrates my improvements over the same, but of course these figures are extremely sketchy and diagrammatic and are intended for the purpose of description only.

The substance 3 in the pores or interstices 2 of the separator prevents sediment from permeating the separator and also acts as a preservative by retarding destructive oxidation of the wood and at the same time permits of the passage of the electric current and free diffusion of the acid electrolyte through the separator.

It may be remarked that a separator of my invention, for the reasons stated, may in some cases be made relatively thin which is, of course, advantageous as in many instances a saving of space in a storage battery is of great importance.

There is a suitable process for manufacturing separators embodying my invention and I will now describe the same.

Figure 1:
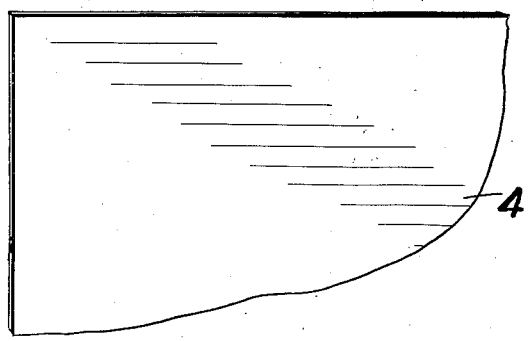
Figure 1, is a perspective view of a part of a separator embodying features of the invention.
Figure 2:
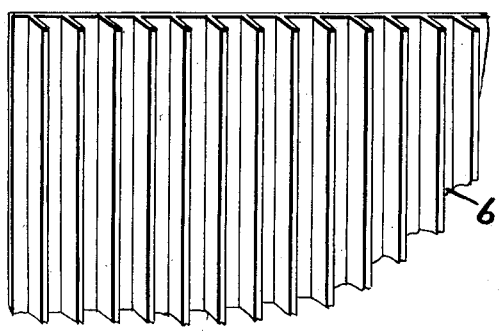
Fig. 2, is a similar view of a different shape of separator embodying features of the invention.

The wood may be subjected to any known or desired preliminary treatment, for example, it may be shaped in the desired form, for instance, flat as shown in Fig. 1 or ribbed as shown in Fig. 2, or in any other form, and it may be subjected to any known treatment for the removal of deleterious matter, if it contains such matter. For instance a wood separator may be leached with acid or alkali, then thoroughly washed and without drying soaked in a solution of soluble silicate as potassium or sodium silicate. The process comprises the treatment with soluble silicate and the length of the soaking may be varied widely as also the strength of the solution, but in connection with wood preliminarily treated in the manner described I find that forty-eight hours' soaking in a solution of sodium silicate of 1300 specific gravity gives excellent results. The result of this soaking is to fill all the pores or interstices with soluble sodium silicate. The final step in the process is to place the separators after draining off the surplus silicate solution, if any, but without drying, in a dilute sulfuric acid solution of, for example, 1.2 specific gravity. This can be done after assembling the plates and separators in the battery cells by filling the latter with the regular electrolyte. The result of treating the separators with sulfuric acid is to decompose the sodium silicate in their pores or interstices with the formation of gelatinous silica which is thus distributed throughout the interior of the body of the separator filling all its pores and interstices and thus converting it into a non-porous though conducting structure. Non-porous in the sense that its pores are closed to the passage of fine particles of solid battery matter and conductive in the sense that it allows of the necessary diffusion of the electrolyte.

A separator treated in the manner described is impermeable to sediment suspended in the electrolyte and is very much more durable than ordinary wood separators, while at the same time it permits sufficiently free passage of the electric current and diffusion, osmosis or equivalent of the electrolyte. The surface of a separator so treated is protected from oxidation and the mass of the wood resists the softening and weakening action of the electrolyte when the battery is in use, so that such separators are less subject to physical breakage than ordinary wood separators. Again the above treatment does not materially increase the internal resistance of the separators.

Figure 3:
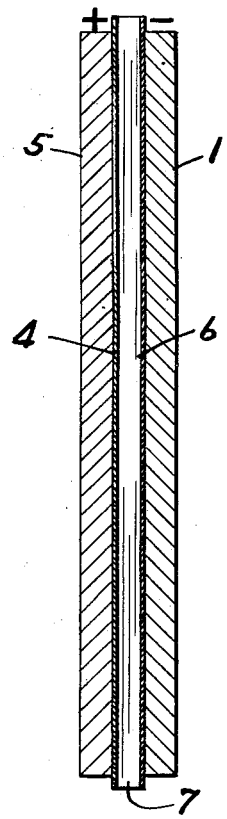
Fig. 3 is a vertical section illustrating one way of assembling separators embodying the invention with positive and negative pole plates.
Figure 6:
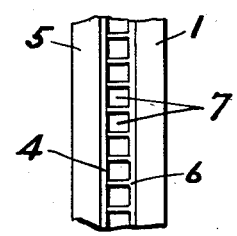
Fig. 6 is a top or plan view illustrating the separator assemblage of Fig. 3.

For the sake of a further description of the invention reference may be made to Figs. 3 and 6, in which a separator 4, Fig. 1, embodying features of the invention and treated in accordance with it is placed directly in contact with the positive pole plate 5, and a ribbed separator 6, Fig. 2, embodying features of and treated in accordance with the invention is placed in contact with the negative pole plate 1 and with the separator 4. The point of this is that a wood separator treated in accordance with the present invention and embodying it is placed directly in contact with the positive pole plate and yet resists the oxidizing action that takes place when the battery is in use. Incidentally the described arrangement is one way in which wells or channels 7 are provided for the circulation of the electrolyte.

It will, of course, be understood that a wooden separator of this invention and of whatever form may be placed directly in contact with the positive pole plate and in that way the rubber insulation heretofore employed in connection with wood separators can be omitted, which is a matter of considerable saving both in cost and space.

Since the wood separator or veneer 4 extends continuously all over the face of the positive pole plate 5 with which it contacts it is evident that it operates to efficiently retain any sediment or particles that may become loose in place on the face of the positive pole plate, so that the life of the positive pole plate is prolonged. Of course, the other advantages herein described are also present, and it will be obvious to those skilled in the art to which the invention relates that modifications may be made in details of construction, arrangement and procedure without departing from the spirit of the invention and since the invention is largely chemical in its nature, I desire to emphasize the fact that I particularly claim the benefit of equivalents both as to the substances employed and the procedure followed.

What I claim is:

1. A separator consisting of the combination of wood and a gelatinous substance filling the interstices of the wood and adapted to protect the same from destructive action.

2. In a storage battery the combination of a positive pole plate and a separator and retainer in contact therewith and consisting of wood and a gelatinous substance filling the interstices of the woood and preventing the passage of fine detached active material and protecting the wood from destructive action.

3. In a secondary battery and in combination with the plates thereof a separator and retainer consisting of a sheet of wood impregnated with a conducting gelatinous substance which protects the wood from the corrosive action in the battery and fills its pores against the passage of active material and allows of the necessary osmosis of the electrolyte.

4. In a secondary battery and in combination with the plates thereof a separator and retainer consisting of a sheet of wood impregnated with an osmotic gelatinous substance which protects the wood from the corrosive action in the battery and fills its pores against the passage of active material and allows of the necessary osmosis of the electrolyte.

5. In a secondary battery and in combination with the plates thereof a conducting separator and retainer consisting of a sheet of wood impregnated with a silicate in insoluble gelatinous form which protects the wood from the corrosive action in the battery and fills its pores against the passage of active material and allows of the necessary osmosis of the electrolyte.

6. A wood separator for storage battery plates having gelatinous silica in its pores or interstices.

EDWARD WANTON SMITH.

Witnesses:
 WM. C. DU BOIS,
 BRUCE FORD.